United States Patent [19]

Yamamoto et al.

[11] Patent Number: 4,806,219

[45] Date of Patent: Feb. 21, 1989

[54] METHOD OF DOUBLE DECOMPOSITION OF NEUTRAL SALT

[75] Inventors: Yoshihisa Yamamoto, Kudamatsu; Yasuhiro Kagiyama, Tokuyama, both of Japan

[73] Assignee: Tokuyama Soda Kabushiki Kaisha, Yamaguchi, Japan

[21] Appl. No.: 187,366

[22] Filed: Apr. 28, 1988

[51] Int. Cl.$^4$ ............................ C02F 1/46; C25B 7/00; B01D 13/02
[52] U.S. Cl. .................... 204/182.4; 204/301; 204/103; 204/96; 204/98
[58] Field of Search ............... 204/301, 182.4, 182.5, 204/96, 182.3, 149, 151, 152, 97, 98, 100, 101, 102, 103, 104, 153

[56] References Cited

U.S. PATENT DOCUMENTS 2,829,095  4/1958  Oda et al. .................. 204/301 X
3,654,125  4/1972  Leitz ........................ 204/182.5 X

FOREIGN PATENT DOCUMENTS 891111  12/1981  U.S.S.R. .................... 204/301
1237230  6/1986  U.S.S.R. .................... 204/301
1274714  12/1986  U.S.S.R. .................... 204/301

Primary Examiner—John F. Niebling
Assistant Examiner—John S. Starsiak
Attorney, Agent, or Firm—Sherman and Shalloway

[57] ABSTRACT

Disclosed is a simple and convenient method by which a salt typified by sodium chloride, generally a neutral salt, is decomposed by using a three-compartment electrodialysis cell comprising a special ion-exchange membrane to form an acid and an alkali in high concentration at a high current efficiency.

3 Claims, 1 Drawing Sheet

METHOD OF DOUBLE DECOMPOSITION OF NEUTRAL SALT

BACKGROUND OF THE INVENTION

1. Field of the Invention

This invention relates to a method of double decomposition of a salt. More specifically, it relates to a simple and convenient method by which a salt typified by sodium chloride, generally a neutral salt, is decomposed by using a three-compartment electrodialysis cell comprising a special ion-exchange membrane to form an acid and an alkali in high concentrations at a high current efficiency.

2. Description of the Prior Art

Methods involving the use of an ion-exchange membrane have previously been known for the formation of an acid such as hydrochloric acid and an alkali such as sodium hydroxide by double decomposition of a salt such as sodium chloride. Such a method is carried out in a three-compartment electrodialysis cell comprised of an anode, a cathode, sets of a cation-exchange membrane, a bipolar membrane (composite membrane) and anion-exchange membrane sequentially and repeatedly arranged between the anode and the cathode, a salt compartment formed between the cation-exchange membrane and the anion-exchange membrane, a base compartment formed between the cation-exchange membrane and the anion-exchange resin side of the bipolar membrane and an acid compartment between the cation-exchange resin side of the bipolar membrane and the anion-exchange membrane. By applying a direct-current voltage across the anode and the cathode of the three-compartment ion-exchange membrane electrodialysis cell while passing an aqueous solution of a salt through the salt compartment, a dilute alkali solution or water through the base compartment and dilute hydrochloric acid or water through the acid compartment, ions of the salt, for example a sodium ion ($Na^+$) and a chlorine ion ($Cl^-$) of sodium chloride, permeate the cation-exchange membrane and the anion-exchange membrane respectively and are discharged in the base compartment and the acid compartment. At the same time, water dissociated in the bipolar membrane is separated into a hydroxyl ion ($OH^-$) and a hydrogen ion ($H^+$), whereby sodium hydroxide (NaOH) is formed in the base compartment and hydrochloric acid (HCl), in the acid compartment.

The method in which a salt is double-decomposed in a conventional three-compartment electrodialysis cell, however, has the disadvantage that the concentrations of the resulting acid and alkali and the current efficiency are low. This is because the acid and alkali diffuse through the bipolar membrane and neutralization occurs, or the permeability of the hydrogen ion ($H^+$) through the anion-exchange membrane is high, and/or the permeability of the hydroxyl ion ($OH^-$) through the cation-exchange membrane is high. For example, when ordinary cation-exchange membranes, bipolar membranes and anion-exchange membranes are used, the concentrations of the resulting acid and alkali is several percent by weight, and the current efficiency is about 70%, and attempts to increase their concentrations result in a rapid decrease in current efficiency.

SUMMARY OF THE INVENTION

The present inventors extensively worked in order to solve the aforesaid problem of the prior art, and have now found that an acid and/or an alkali can be formed in an concentration of as high as 10% by weight or more at a high current efficiency of, for example, 90% or more by using an ion-exchange membrane electrodialysis cell comprising at least one unit consisting of special two types of bipolar membranes and an anion-exchange membrane, feeding an aqueous solution of a salt into salt compartments (which may concurrently act as an anode compartment and a cathode compartment when there is only one such unit) of the cell and electrodialytically treating it.

FIG. 1 shows the basic structure of an electrodialysis cell used in this invention. In the drawing, (+) represents an anode; (−), a cathode; (a/c), a high cation-exchange group-type bipolar membrane; (A/C), a neutral bipolar membrane; (A), an anion-exchange membrane; and U, one unit.

The structure, and the method of operation, of the electrodialysis cell used in this invention and the method of its operation are nearly the same as those of the conventional three-compartment electrodialysis cell, but the invention is characterized by using special ion-exchange membranes.

Specifically, the present invention provides a method of double-decomposing a salt, which comprises using an electrodialysis cell comprising an anode and a cathode and at least one unit disposed between the anode and the cathode, said unit being comprised of (1) a high cation-exchange group-type bipolar membrane (membrane a/c) composed of a layer of a resin having an anion-exchange group bonded thereto (layer a) and a layer of a resin having a cation-exchange group bonded thereto (layer c), the thickness of the layer a being 100 Å to one-half of the total thickness of the membrane (a/c) and the equivalent ratio of the anion-exchange group to the cation exchange group in the membrane (a/c) being from 0.01 to 0.5, preferably from 0.05 to 0.3, (2) a neutral bipolar membrane (membrane A/C) composed of an anion-exchange resin layer (layer A) and a cation-exchange resin layer (layer C) and having a fixed ion concentration of at least 10 meq/g $H_2O$, preferably not more than 20 meq/g $H_2O$, the equivalent ratio of the anion-exchange group to the cation-exchange group in the membrane (A/C) being from 0.6:1 to 1:0.6, preferably from 0.9:1 to 1:0.9, and (3) an anion-exchange resin membrane (membrane A) having an amino group with a long hydrocarbon chain as an anion-exchange group, said membranes (1) to (3) being arranged in the order of the membrane a/c—the membrane A/C with its layer A facing the membrane a/c—the membrane A from the anode side to the cathode side to form a salt compartment, a base compartment, an acid compartment and a salt compartment;

causing an aqueous solution of a base to be present in the base compartments, an aqueous solution of an acid in the acid compartments and an aqueous solution of a salt in the salt compartments, and applying a direct-current voltage across the anode and the cathode.

DETAILED DESCRIPTION OF THE INVENTION

Figure 1:
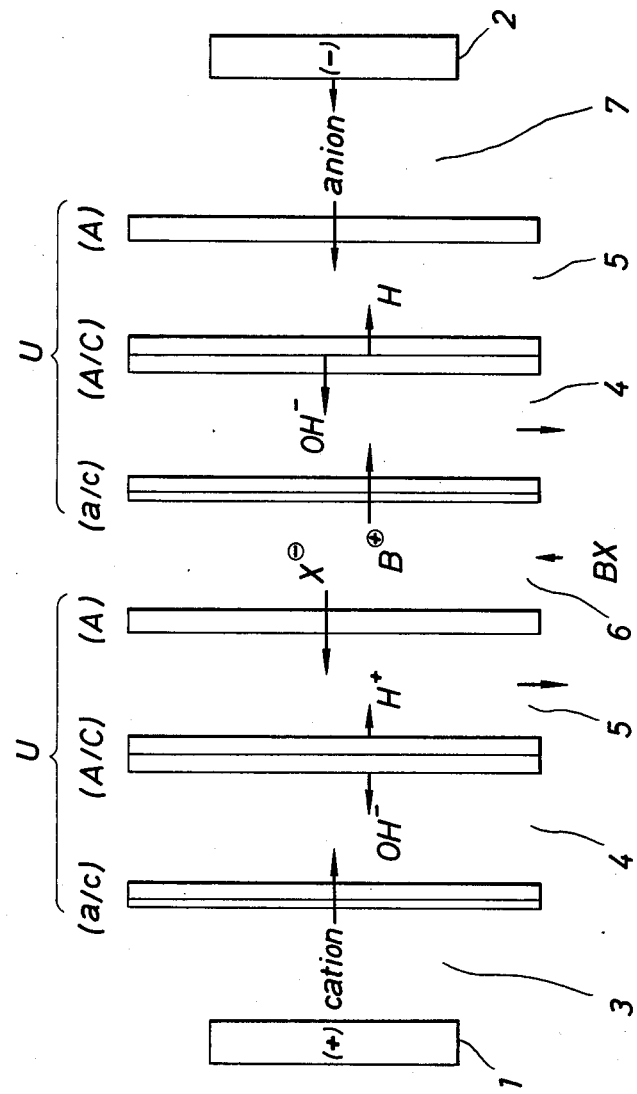

The electrodialysis cell used in this invention is of nearly the same structure as the conventional three-compartment dialysis cell. Known electrolytic dialysis cells and known electrolysis methods may be directly applied to the practice of this invention except that a high cation-exchange group-type bipolar membrane (membrane a/c) composed of layers a and c in which the thickness of the layer a is 100 Å to one half of the total thickness of the membrane a/c and the equivalent ratio of the anion-exchange group to the cation-exchange group in the membrane is from 0.01 to 0.5, preferably from 0.05 to 0.3, is used instead of the cation-exchange membrane with its layer a being placed opposite to the anode; that an anion-exchange resin membrane A having an amino group with a long hydrocarbon chain as an anion-exchange group is used instead of the known anion-exchange resin; and that a neutral bipolar membrane (A/C) in which the fixed ion concentration of the cation-exchange resin layer is used at least 10 meq/g $H_2O$ is used. For example, an apparatus solid as AQUA TECH System by Allied Corporation can be utilized.

The principle of the electrodialysis in this invention will be described with reference to FIG. 1. One unit composed of the high cation-exchange group-type bipolar membrane (a/c), the neutral bipolar membrane (A/C) and the special anion exchange membrane (A) and following, this another unit composed of the membrane a/c, the membrane A/C and the membrane A are disposed between the anode 1 and the cathode 2. As required, many such units, for example 50 to 100 or more units, may be arranged between the electrodes. In FIG. 1, only two units are shown. Thus, in FIG. 1, the electrolytic cell is comprised of an anode compartment 3 in which the anode 1 exists, a base compartment 4 defined by the membrane a/c and the membrane A/C, an acid compartment 5 defined by the membrane A/C and the membrane A, a salt compartment 6 defined by the membrane A and the membrane a/c, and a cathode compartment 7 in which the cathode 2 exists. In the electrodialysis cell of the above structure, an aqueous solution of a salt for example BX wherein B represents a cation of ammonium or a metal and X represents an anion of an acid radical, for example, is fed into the salt compartment 6, and generally an aqueous solution of a salt, preferably an aqueous solution of BX, is also fed into the two electrode compartments. Usually, a dilute aqueous solution of $B(OH)_n$ wherein n is the equivalent number of the B ion is fed in advance into the base compartment, and a dilute aqueous solution of $H_mX$ wherein m is the ion equivalent number of X is fed into the acid compartment. By applying a d-c voltage across the anode and the cathode, the aqueous salt solution in the salt compartment is desalted to permit migration of a cation such as a metal to the adjacent base compartment and an anion such as an acid radical to the acid compartment. In the meantime, water is decomposed by the neutral bipolar membrane (A/C) in the base compartment and a hydroxyl ion ($OH^-$) is supplied to form a base. In the acid compartment, water is decomposed by the neutral bipolar membrane (A/C), and the hydrogen ion ($H^+$) is supplied to form an acid. The base and the acid are taken out of the system.

In the present invention, the salt to be supplied to the salt compartment may be generally, for example, an ammonium salt such as ammonium chloride, an alkali metal halide such as sodium chloride, sodium bromide and potassium chloride, sodium sulfate, potassium nitrate, potassium sulfate, sodium nitrate, or a mixture thereof. They are used as an aqueous solution. The concentration of the salt can be 0.1% by weight to saturation, but generally it is at least 20% by weight.

The resulting base and/or acid can be obtained in a high concentration of, for example, 1 to 20% by weight, especially 10 to 20% by weight, at a current efficiency of as high as at least 90%. The electrodialysis cell may be any of conventional three-compartment electrodialysis cells of the filter press type, unit cell type, etc. so long as they basically have the structure depicted in FIG. 1.

The voltage to be applied, the current density, the treating time and the amounts of the salt initially fed (or replenished) in the electrodialyzer in accordance with this invention may be properly chosen in accordance with the conventional electrodialysis conditions.

The ion-exchange membranes used in this invention will now be described in detail.

The high cation-exchange group-type bipolar membrane used in this invention is of such a structure that at least one anion-exchange group such as a primary amine group, a secondary amine group, a tertiary amine group or a quaternary ammonium group is bonded to the surface of a cation exchange membrane substrate through a chemical bond such as an acid amide bond or an ester bond or by entanglement of the molecules to one another so that the anion-exchange membrane exists in a thickness of 100 Å to one-half of the total thickness of the high cation-exchange group-type bipolar membrane. Generally, the exchange capacity of the anion-exchange membrane is $10^{-6}$ to $10^{-2}$ eq/cm², preferably $10^{-3}$ to $10^{-2}$ eq/cm², of the surface area of the membrane, and the equivalent ratio of the anion-exchange group to the cation-exchange group in the entire membrane is from 0.01 to 0.5, preferably from 0.05 to 0.3.

The thickness of the layer a containing the anion-exchange resin should be at least 100 Å. If it is less than 100 Å, the inherent effect of the bipolar membrane is lost.

If the thickness of the layer a exceeds one-half of the total membrane thickness, the electrical resistance of the membrane increases extremely and the cation migration rate decreases. Hence, the membrane becomes useless in this invention.

Preferably, the anion-exchange group is present in a higher concentration per unit area as the thickness of the layer a becomes smaller. Furthermore, the concentration of the anion-exchange group in the layer a may be lower as the degree of crosslinking of the resin matrix in the layer having the cation-exchange group becomes higher. Generally, the matrix resin constituting the layer c has a crosslinking agent copolymerized in a proportion of 1 to 10 mole% as monomeric units. For example, if 20 to 30 mole% of the crosslinking agent is copolymerized, it is sufficient that the concentration of the anion-exchange group in the layer a is about $10^{-6}$ to $10^{-3}$ eq/cm².

A quaternary ammonium salt group is a preferred anion-exchange group, but other so-called onium salt groups such as pyridinium, sulfonium and phosphonium salt groups may also be used.

There is not limitation on the method of fixing the anion-exchange group such as a quaternary ammonium salt group, to the surface of the cation exchange membrane, and any known methods may be employed. For example, it may be accomplished by coating a compounds having both an amino and a vinyl group, or a compound having both a quaternary ammonium salt group and a vinylbenzyl group and if required a radical initiator on the surface of a cation-exchange membrane, for example, and therafter forming a grafted bond by heating or by ultraviolet radiation.

The cation-exchange resin layer of the high cation-exchange group-type bipolar membrane may be a known cation-exchange resin membrane. The cation-exchange group of the cation-exchange resin membrane may be an active group capable of forming a chelate structure with a heavy metal, and a sulfonic acid group, a carboxylic acid group, a phosphonic acid group, a sulfate ester group, a phosphate ester group or a thiol group.

In the present invention the above-described special bipolar membrane itself is an important constituent element, and the method of its production is by no means limited. To facilitate the production of the membrane, both surfaces of the cation-exchange resin membrane may be treated to introduce an anion-exchange group. If the equivalent ratio of the anion-exchange group to the cation-exchange group is in the range of from 0.01 to 0.5, the anion-exchange group layer formed on one surface can be neglected.

The neutral bipolar membrane used in this invention is composed of a cation-exchange resin layer (layer C) on one surface and an anion-exchange resin layer (A) on the other surface and has a fixed ion concentration of at least 10 meq/g $H_2O$, preferably 10 to 20 meq/g $H_2O$. A neutral bipolar membrane having a fixed ion concentration of less than 10 meq/g $H_2O$ has a reduced hydrolysis efficiency, and the reverse diffusion of the hydrogen ion ($H^+$) and the hydroxyl ion ($OH^-$) increases. There is no particular restriction on the upper limit of the fixed ion concentration. The upper limit is generally about 20 meq/g $H_2O$. Higher fixed ion concentrations result in an increase in the electrical resistance of the membrane and therefore in a decrease in current efficiency. A neutral bipolar membrane which can be conveniently used may be prepared, for example, by polymerizing an aromatic compound monomer having a haloalkyl group and a polymerizable vinyl group, a nitrile compound monomer having a vinyl group, and a comonomer forming a crosslinkage, particularly a monomeric mixture composed mainly of a polyvinyl compound monomer to form a polymeric membrane, crosslinking one surface of the polymeric membrane and introducing a cation-exchange group into it, and introducing an anion-exchange group into the other surface of the polymeric membrane. In the present invention, the neutral bipolar membrane may be produced by any methods of producing known bipolar membranes.

In one method of forming a bipolar membrane having a cation-exchange resin layer with a high fixed ion concentration, the aromatic compound monomer having a haloalkyl group and a polymerizable vinyl group is used in a proportion of at least 60% by weight, preferably 60 to 95% by weight, based on the entire monomers. If the proportion of the above aromatic compound monomer is less than 60% by weight, a dense cation-exchange layer cannot be obtained even when the resulting polymeric membrane is crosslinked and a cation-exchange group is introduced into it. Hence, a bipolar membrane having a high fixed ion concentration of at least 10 meq/g $H_2O$ cannot be obtained. If the proportion of the aromatic compound monomer exceeds 95% by weight, the electrical resistance of the resulting bipolar membrane undesirably increases.

More specifically, the neutral bipolar membrane can be obtained by exposing one surface of the polymeric membrane by a known method, for example by attaching a film of polypropylene, polyvinylfluoride, polytetrafluoroethylene or the like to one surface of the polymeric membrane or holding the two polymeric membranes by two frames, and subjecting the exposed surface to crosslinking treatment through the haloalkyl group and to introduction of a cation-exchange group. Generally, this crosslinking treatment by the haloalkyl group may be carried out by using a known Friedel-Crafts catalyst such as sulfuric acid, aluminum chloride, tin tetrachloride or titanium tetrachloride. Where a sulfonic acid group is to be introduced as the cation-exchange group, the introduction of the cation-exchange group and crosslinking can be simultaneously achieved by using concentrated sulfuric acid, chlorosulforic acid or a mixture of both. A carboxyl group and a phosphone group may also be introduced as the cation-exchange group by known methods. The degree of crosslinkage in the resulting cation-exchange resin layer may be properly adjusted by controlling the diffusion speed of concentrated sulfuric acid, chlorosulfonic acid or a mixture of both in the membrane. If the degree of crosslinking is low, the fixed ion concentration of the cation-exchange resin layer is reduced and a dense cation-exchange layer cannot be obtained. If it is too high, the membrane resistance becomes high. The thickness of the cation-exchange layer is 10 to 80%, preferably 15 to 50%, of the thickness of the bipolar membrane. If the thickness of the cation-exchange resin layer increases the membrane resistance tends to increase.

By introducing an anion-exchange group into the other surface of the polymeric membrane (when the film is attached, the surface from which the film has been stripped), an anion-exchange resin layer is formed and a bipolar membrane is obtained. The type of the anion-exchange group and the method of its introduction may be any of those used in the prior art. For example, the anion-exchange resin layer may be formed by immersing the polymeric membrane having the cation-exchange resin layer on one surface in a bath composed of a solution of a compound containing at least one of primary, secondary and tertiary amines, particularly the tertiary amines suitable for obtaining a strongly basic anion-exchange group, in a solvent such as water, alcohol or acetone. The fixed ion concentration of the anion-exchange resin layer of the resulting bipolar membrane is generally 5 to 20, preferably 5 to 10, meq/g $H_2O$. To increase the fixed ion concentration of the anion-exchange resin layer too much is undesirable because it results in an increase in the electrical resistance of the membrane as compared with the fixed ion concentration of the cation-exchange resin layer.

The anion-exchange membrane used in this invention has an amino group with a long hydrocarbon chain as an anion-exchange group. It should be understood that the term "amino group", as used herein is meant to include imino and pyridine groups as well. The long hydrocarbon chain denotes a hydrocarbon residue having 9 to 30 atoms, preferably 11 to 18 atoms, which may be substituted or unsubstituted. The hydrocarbon residue may be, for example, a long-chain alkyl group, an alkylallyl group or a polyethylene oxide group. If the number of atoms of the long-chain hydrocarbon residue bonded to the nitrogen atom of the anion-exchange group have less than 9 atoms, the fixed ion concentration of the resulting anion-exchange resin membrane tends to decrease. Also, if the number of atoms have more than 30 atoms, the electrical resistance of resulting anion-exchange resin membrane tends to increase. In either case, losses of the current or voltage increase undesirably. The long-chain hydrocarbon residues may partly contain a linear moiety, a chain moiety having a branch, or a ring such as a benzene ring. Generally, a linear long-chain hydrocarbon residue is effective and preferred for increasing the fixed ion concentration.

An amino group having at least one long-chain hydrocarbon residue to the nitrogen atom acts itself as an anion-exchange group. By converting the amino group into a quaternary ammonium salt group, it becomes an excellent anion-exchange group. However, an anion-exchange resin composed of an amino group having no long-chain hydrocarbon residue bonded to the nitrogen atom may be present in the matrix resin constituting the anion-exchange resin. For example, it is possible to use an anion-exchange resin membrane obtained by copolymerizing an amino vinyl compound having a short hydrocarbon residue such as a methylpyridinium salt group.

Thus, the proportion of the amino group (including a quaternary ammonium salt group) having a long side chain in the anion-exchange resin membrane is 10 to 100%, preferably 40 to 100%, of the entire anion exchange groups present in the anion-exchange resin membrane.

There is no particular restriction on the method of producing the anion-exchange resin membrane used in this invention. Generally, it may be easily obtained by using a monomer having an amino group with a long-chain alkyl group or the like bonded thereto as one monomers constituting the anion-exchange resin, and copolymerizing these monomers. This method, however, is not limitative.

Any vinyl monomers having an amino group with at least one long-chain alkyl group bonded thereto may be used in this invention. Examples of preferred vinyl monomers are those of the following general formulae.

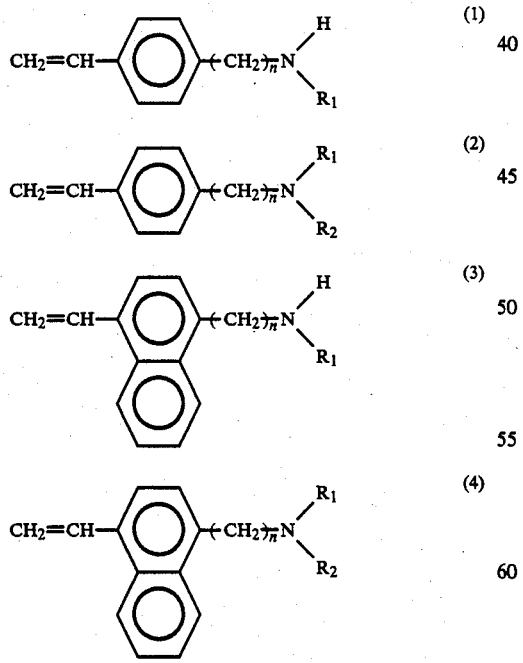

In formulae (1) to (4), $R_1$ represents an alkyl group having 9 to 20 carbon atoms; $R_2$ represents an alkyl group having 1 to 20 carbon atoms; and n represents an integer of 1 to 4. Vinylbenzenes and vinylnaphthalenes are particularly preferred. Typical specific examples of the compounds of the above formulae are shown below.

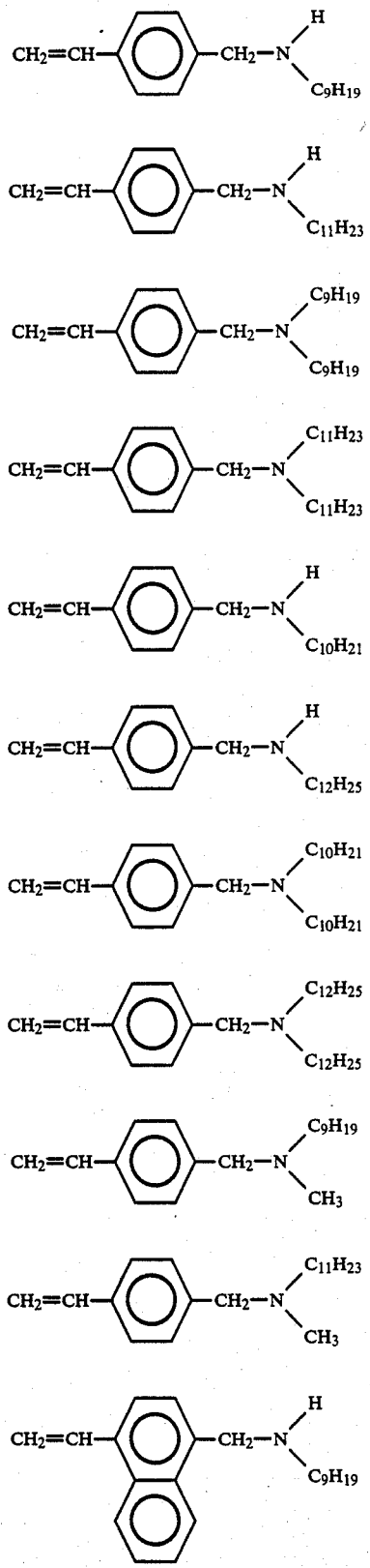

-continued

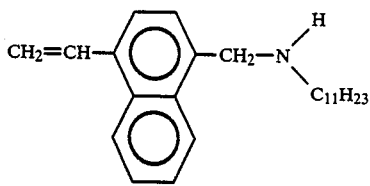
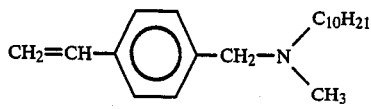
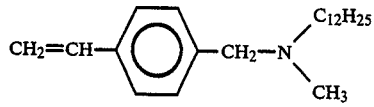
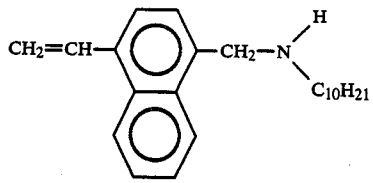
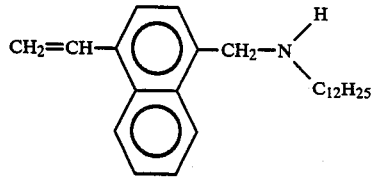
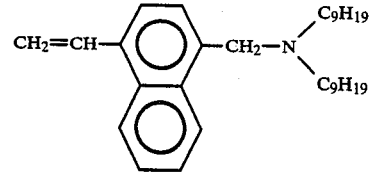
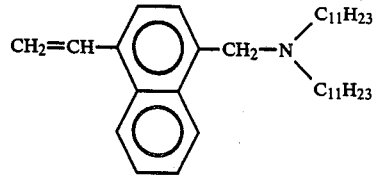
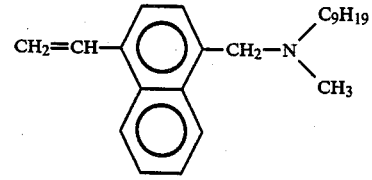
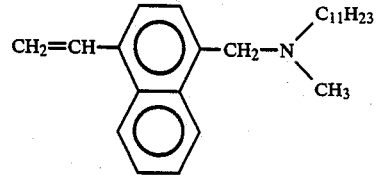

-continued

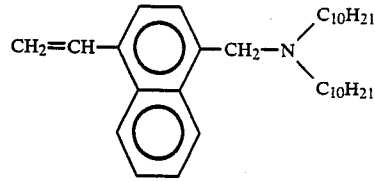
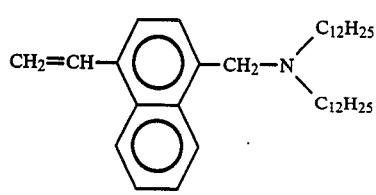
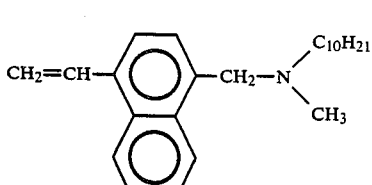
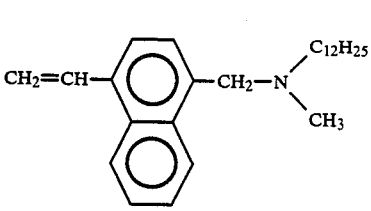

The anion-exchange membrane used in this invention can be obtained by polymerizing a monomeric mixture containing a vinyl monomer having an amino group with the aforesaid long-chain alkyl group or the like bonded thereto and a crosslinking agent and as required, other vinyl monomers copolymerizable with these monomers. Any methods of producing known anion-exchange membranes can be used in this invention provided that the long-chain aminovinyl compound described above is copolymerized as one monomer component.

According to the method of double decomposition in according with this invention, an acid and an alkali can be formed in high concentrations at a high current efficiency by a simple procedure of feeding an aqueous solution of a salt into a three-compartment electrodialysis cell built by combining specific ion-exchange membranes. The reason for this advantage is not entirely clear, but it is presumed that the characteristics of the two types of specific bipolar membranes and the anion-exchange membrane used in the three-compartment electrodialysis cell act very effectively in the double decomposition of a salt. Since in the bipolar membranes used in this invention, cation-exchange groups are present uniformly in the cation-exchange layer and a very dense crosslinked structure is formed, the diffusion of protons (H+) and hydroxyl groups (OH−) *scarcely occurs at the time of double decomposition of a salt and the amount of water diffused by electrosmosis is very small. Furthermore, the anion-exchange membrane used in this invention has a high fixed ion concentration throughout its layer, and therefore shows a high ion exchange capacity and a low electrical resistance. Consequently, its anion selectivity is high. The osmetic of proton ($H^+$) ions is very little, and the amount of water diffused* by electrosmosis (including the amount of osmetic water) is very small.

The following examples illustrate the present invention in detail. It should be understood however that the invention is not particularly limited to these examples.

In these examples, all parts are by weight.

The fixed ion concentration of the membrane in these examples was determined as follows:

Two samples were taken from the same ion-exchange membrane. One sample was equilibrated with 1N hydrochloric acid and then washed several times with methanol to remove the hydrochloric acid absorbed on the membrane. It was then washed with 0.2N sodium nitrate to perform ion exchange. The washings were collected and concentrated, and the chlorine ion contained in it was quantiatively determined. The exchange capacity (EC) of the membrane was thus measured. On the other hand, the other sample was equilibrated with 0.5N sodium chloride solution and weighed to measure its wet weight (Wet W). Then, at 30° C., the membrane was dried for 16 hours under reduced pressure, and its dry weight was measured. The fixed ion concentration of the membrane whose dry weight (Dry W) was measured was determined in accordance with the following formula $$\frac{(EC)}{\frac{(Wet\ W) - (Dry\ W)}{(Dry\ W)}}$$

and expressed in meq/g.H$_2$O.

The salt double-decomposition characteristics are determined by the following procedure.

A high cation-exchange group-type bipolar membrane (membrane a/c), a neutral bipolar membrane (membrane A/C) and an anion-exchange membrane (membrane A) were arranged between an anode and a cathode and clamped up to build a three-compartment electrodialysis cell (available area 2 dm$^2$). By using this electrolydialysis cell, a 25 wt% aqueous NaCl solution was fed into salt comparments (in this case, an anode compartment and a cathode compartment), and 1–10% hydrochloric acid was fed into an acid compartment. Furthermore, 1 to 10% NaOH was fed into a base compartment. Dialysis was carried out at a temperature of 20° to 50° C. and a current density of 0.1 to 10 A/dm$^2$. The initial concentrations of HCl and NaOH, their concentrations after dialysis, and the current efficiency were measured.

The physical properties of the membranes used in the following Examples and Comparative Examples are summarized in Table 2.

REFERENTIAL EXAMPLE 1

Production of a bipolar membrane (A/C-1):

A monomer mixture solution composed of 100 parts of chloromethylstyrene, 12 parts of acrylonitrile, 7 parts of chlorosulfonated polyethylene rubber, 20 parts of divinylbenzene having a purity of about 55% and 4 parts of benzoyl peroxide was coated on a plain-weave cloth of polypropylene. Both surfaces of the coated cloth were covered with a polyester film, and the coating was polymerized at 80° C. for 10 hours to form a polymeric membrane. A polypropylene film was attached to one side of this polymeric membrane and the membrane was immersed in a customary manner in a mixed solution of chlorosulfonic acid and sulfuric acid to introduce a sulfonic acid group into one surface of the polymeric membrane. Then, the membrane was hydrolyzed, washed with water, and immersed in dilute hydrochloric acid. The film was then stripped off, and the membrane was immersed in a 10% aqueous solution of trimethylamine at room temperature for 24 hours. It was further immersed in dilute hydrochloride acid, water and a 0.5N aqueous solution of sodium chloride to give a membrane A/C-1.

Production of an anion-exchange membrane (A-1):

A paste-like mixture prepared by mixing 100 parts of vinylbenzyldilaurylamine (N,N-dilaurylaminomethylstyrene), 10 parts of divinylbenzene having a purity of about 55%, 30 parts of styrene, 10 parts of acrylonitrile rubber (Hycar 1042 produced by Nippon Zeon Co., Ltd.) and 4 parts of azobisisobutyronitrile was coated on a polyvinyl chloride cloth. The coated cloth was deaerated and then covered with polyester films on both surfaces. The coating was polymerized at 75° C. for 5 hours to form a polymeric membrane. The membrane was immersed in n-hexane at 30° C. for 6 hours to give an anion-exchange membrane (A-1).

Production of a high cation-exchange group-type bipolar membrane (a/c-1):

N,N,N',N'-tetramethyl-1,6-hexanediamine (17.3 g) and 30.6 g of chloromethylstyrene were reacted at room temperature for 24 hours to obtain a compound having one quaternary ammonium salt group and one vinylbenzyl group. A cation-exchange membrane (Neosepta CM, a strongly acidic cation-exchange membrane made by Tokuyama Soda Co., Ltd.) was immersed for 2 hours at 30° C. in 1.0N sodium chloride solution containing 1000 ppm of the above compound, and then potassium persulfate and sodium sulfite as polymerization initiators were added under a nitrogen atmosphere so that their concentrations were 1,000 ppm respectively. The mixture was vigorously stirred, and 10 hours later, the membrane was taken out to give a cation-exchange membrane (a/c-1).

EXAMPLE 1

Using the membranes A-1, A/C-1 and a/c-1 obtained in Referential Example 1, sodium chloride was double-decomposed under the conditions indicated hereinabove. The results are shown in Table 1.

COMPARATIVE EXAMPLE 1

Production of a bipolar membrane (A/C-2):

A monomer mixture solution composed of 100 parts of chloromethylstyrene, 20 parts of divinylbenzene having a purity of about 55%, 15 parts of dioctyl phthalate, 7 parts of chlorosulfonated polyethylene rubber and 4 parts of benzoyl peroxide was coated on a plain-weave cloth of polypropylene. The coated cloth was covered with polyester films on both surfaces, and the coating was polymerized at 80° C. for 8 hours to form a polymeric membrane.

Using the resulting membrane A/C-2 and the membrane a/c-1 and the membrane A-1 produced in Referential Example 1, sodium chloride was double-decomposed under the conditions indicated hereinabove. The results are shown in Table 1.

REFERENTIAL EXAMPLE 2

Production of a bipolar membrane (A/C-3):

A monomer mixture solution composed of 100 parts of chloromethylstyrene, 15 parts of methacrylonitrile, 7 parts of acrylonitrile-butadiene rubber, 15 parts of divinylbenzene having a purity of about 80% and 4 parts of benzoyl peroxide was coated on a plain-weave cloth produced by mix-weaving polyvinyl chloride and polypropylene fibers. The cloth was covered with polyester films on both surfaces, and the coating was polymerized at 80° C. for 10 hours to form a polymeric membrane. The polymeric membrane was then worked up as in Referential Example 1 to give a bipolar membrane (A/C-3).

Production of an anion-exchange membrane (A-2):

A paste-like mixture obtained by mixing 70 parts of vinylbenzyldioctylamine, 15 parts of divinylbenzene having a purity of about 80%, 8 parts of acrylonitrile-butadiene rubber and 3 parts of azobisisobutyronitrile was coated on a plain-weave cloth obtained by mix-weaving polyvinyl chloride and polypropylene fibers. The cloth was deaerated, and then covered with polyester films on both surfaces. The coating was polymerized at 75° C. for 7 hours to form a polymeric membrane. The resulting membrane was immersed in methyl iodide and n-hexane at 30° C. for 24 hours and then washed with n-hexane to give an anion-exchange membrane (A-2).

Production of a high cation-exchange group-type bipolar membrane (a/c-2):

One hundred parts of styrene, 12 parts of divinylbenzene having a purity of about 80%, 8 parts of dioctyl phthalate and 15 parts of a fine powder of polyvinyl chloride were heated with stirring. After allowing the mixture to cool, 3 parts of benzoyl peroxide was added. The resulting mixed solution was coated on a plain-weave cloth of polyvinyl chloride. The coated cloth was covered with polyester films on both surfaces, and the coating was polymerized at 110° C. for 5 hours to form a polymeric membrane. The membrane was immersed in a mixed solution of chlorosulfonic acid and sulfuric acid at 40° C. for 1 hour to form about 60% of sulfonyl chloride. A 50% viscous mixture of polyethyleneimine and dioctylamine was coated on one surface of the membrane, and left to stand for 16 hours at room temperature. Then, the membrane was washed with water and hydrolyzed to give a membrane a/c-2 (the amount of cation-exchange groups $2 \times 10^{-3}$ eq/cm$^2$).

EXAMPLE 2

Using the membranes A-2, A/C-3 and a/c-2 obtained in Referential Example 2 an electrodialytic cell was built as indicated hereinabove (except that that side of the membrane a/c-2 in which the anion-exchange groups were present was caused to face the salt compartment). Under the same conditions as indicated hereinabove, sodium chloride was double-decomposed. The results are shown in Table 1.

COMPARATIVE EXAMPLE 2

An electrodialysis cell was built as indicated hereinabove using the membranes A/C-3 and a/c-2 produced in Referential Example 2 and a commercial anion-exchange membrane ACS (a strongly basic anion-exchange membrane made by Tokuyama Soda Co., Ltd.). Under the same conditions as indicated hereinabove, sodium chloride was double-decomposed in the electrodialysis cell. The results are shown in Table 1.

REFERENTIAL EXAMPLE 3

Production of a bipolar membrane (A/C-4):

A monomer mixture composed of 120 parts of chloromethylstyrene, 15 parts of acrylonitrile, 5 parts of styrene, 15 parts of bisvinylphenylethane having a purity of about 89%, 8 parts of chlorosulfonated polyethylene rubber and 5 parts of benzoyl peroxide was coated on a plain-weave cloth of polypropylene. The coated cloth was covered with polyester films on both surfaces, and the coating was polymerized at 70° C. for 3 hours and then at 80° C. for 6 hours to form a polymeric membrane. A polypropylene film was attached to one surface of the polymeric membrane, and the membrane was immersed in a customary manner in a mixed solution of chlorosulfonic acid and sulfuric acid to introduce sulfonic acid groups into one surface of the membrane. The membrane was then hydrolyzed, washed with water and immersed in dilute hydrochloric acid. The film was then stripped off, and the membrane was immersed in a 10% aqueous solution of trimethylamine at room temperaure for 24 hours, and then in dilute hydrochloric acid, water and a 0.5N aqueous solution of sodium chloride to give a membrane A/C-4.

Production of an anion-exchange membrane (A-3):

A paste-like mixture obtained by mixing 100 parts of vinylbenzyldecylamine, 12 parts of divinylbenzene having a purity of about 80%, 5 parts of a fine powder of polyvinyl chloride, 4 parts of acrylonitrile-butadiene rubber and 5 parts of azobisisobutyronitrile was coated on a plain-weave cloth obtained by mix-weaving polypropylene and polyvinyl chloride fibers. The coated cloth was deaerated, and then covered with polyester films on both surfaces. The coating was polymerized at 75° C. for 5 hours to form a polymeric membrane. The membrane was then immersed in n-hexane at 30° C. for 12 hours to give an anion-exchange membrane (A-3).

Production of a high cation-exchange group-type bipolar membrane (a/c-3):

3-Vinylpyridine was anionically polymerized to obtained poly(4-vinylpyridine) having a molecular weight of 3,000. The polymer (15.3 g; 0.1 mole) was dissolved in 200 ml of methanol, and 15.3 g (0.1 mole) of chloromethylstyrene was added and reacted at 40° C. for 7 days to convert polyvinylpyridine into a quaternary pyridinium salt and introduce two vinylbenzyl groups.

A cation-exchange membrane (Neosepta CM, a product of Tokuyama Soda Co., Ltd.) was immersed at 40° C. for 3 days in an aqueous solution containing the above polymer in a concentration of 3,000 ppm. The cation-exchange membrane was taken out from the aqueous solution and immersed for 10 hours in an aqueous solution of ammonium persulfate and potassium sulfite both in a concentration of 1,000 ppm under a nitrogen atmosphere to give a cation-exchange group-type bipolar membrane a/c-3 (the amount of the anion-exchange groups present was $1 \times 10^{-3}$ eq/cm$^2$ on each surface).

EXAMPLE 3

Using the membranes A-3, A/C-4 and a/c-4 obtained in Referential Example 3, an electroldialysis cell was built as indicated above, and sodium chloride was double-decomposed under the same conditions as indicated hereinabove. The results are shown in Table 1.

COMPARATIVE EXAMPLE 3

An electrodialysis cell was built in the same way as indicated hereinabove using the membranes A/C-4 and A-3 produced in Referential Example 3 and a commercial cation-exchange membrane (CM, a strongly acidic cation-exchange membrane produced by Tokuyama Soda Co., Ltd.). Under the same conditions as indicated hereinabove, sodium chloride was double-decomposed in the cell. The results are shown in Table 1.

TABLE 1

| Ex. or CEx. (*) | NaOH concentration Initial | NaOH concentration After the treatment | HCl concentration (wt. %) Initial | HCl concentration (wt. %) After the treatment | Current efficiency NaOH (%) | Current efficiency HCl (%) |
| --- | --- | --- | --- | --- | --- | --- |
| Ex. 1 | 5.0 | 8.2 | 3.1 | 4.7 | 97.8 | 98.2 |
| CEx. 1 | 5.0 | 5.3 | 3.1 | 3.2 | 65.0 | 44.5 |
| Ex. 2 | 8.0 | 10.1 | 5.0 | 7.5 | 95.2 | 87.4 |
| CEx. 2 | 8.0 | 8.2 | 5.0 | 4.8 | 50.8 | 57.4 |
| Ex. 3 | 5.0 | 7.9 | 3.0 | 4.5 | 94.8 | 93.8 |
| CEx. 3 | 5.0 | 5.1 | 2.0 | 2.0 | 53.9 | 55.7 |

Note: (*): Ex. stands for Example, and CEx. stands for Comparative Example.

TABLE 2

| Membrane | Fixed ion concentration of layer C (meq/g H$_2$O) | Fixed ion concentration of layer A (meq/g H$_2$O) | Anion-exchange group/cation-exchange group (meq/g/meq/g) | Thickness of the anion-exchange resin layer/total thickness of the ion-exchange membrane (mm/mm) | Amino group having a long-chain/entire anion-exchange groups (meq/g/meq/g) | Remarks |
| --- | --- | --- | --- | --- | --- | --- |
| A/C-1 | 17.1 | 12.5 | 1.5/1.2 | 0.13/0.18 | — | |
| A-1 | — | — | — | — | 2.12 | |
| a/c-1 | — | — | 0.3/2.5 | 0.02/ | — | |
| A/C-2 | 9 | 8.5 | — | — | — | comparison |
| A/C-3 | 12.5 | 10 | 1.4/1.0 | 0.13/0.17 | — | |
| A-2 | — | — | — | — | 2.23 | |
| a/c-2 | — | — | 0.5/2.6 | 0.03 | — | |
| Anion-exchange membrane ACS | — | — | — | — | — | comparison |
| A/C-4 | 17.8 | 14.7 | 1.6/1.3 | 0.14/0.17 | — | |
| A-3 | — | — | — | — | 2.34 | |
| a/c-3 membrane | — | — | 0.2/2.5 | 0.02 | — | |
| Cation exchange membrane CM | 2.5 | — | — | — | — | comparison |

What is claimed is:

1. A method of double-decomposing a salt, which comprises
   using an electrodialysis cell comprising an anode and a cathode and at least one unit disposed between the anode and the cathode, said unit being comprised of
   (1) A high cation-exchange group-type bipolar membrane (membrane a/c) composed of a layer of a resin having an anion-exchange group bonded thereto (layer a) and a layer of a resin having a cation-exchange group bonded thereto (layer c), the thickness of the layer a being 100 Å to one-half of the total thickness of the membrane (a/c) and the equivalent ratio of the anion-exchange group to the cation-exchange group in the membrane (a/c) being from 0.01 to 0.5,
   (2) a neutral bipolar membrane (membrane A/C) and a cation-exchange resin layer (layer C) and having a fixed ion concentration of at least 10 meq/g H$_2$O, the equivalent ratio of the anion-exchange group to the cation-exchange group in the membrane (A/C) being from 0.6:1 to 1:0.5, and
   (3) an anion-exchange resin membrane (membrane A) having an amino group with a long hydrocarbon chain as an anion-exchange group,
   said membranes a/c, A/C and A in said (1) to (3) being arranged in the order of the membrane a/c—the membrane A/C with its layer A facing the membrane a/c—the membrane A from the anode side to the cathode side to form a salt compartment, a base compartment, an acid compartment and a salt compartment;
   causing an aqueous solution of a base to be present in the base compartment, an aqueous solution of an acid in the acid compartment and an aqueous solution of a salt in the salt compartments; and
   applying a direct-current voltage across the anode and the cathode.

2. The method of claim 1 wherein said salt is a neutral salt.

3. The method of claim 1 wherein said salt is sodium chloride.

* * * * *